US011842372B2

(12) United States Patent
Stretch et al.

(10) Patent No.: US 11,842,372 B2
(45) Date of Patent: Dec. 12, 2023

(54) SYSTEMS AND METHODS FOR REAL-TIME PROCESSING OF AUDIO FEEDBACK

(71) Applicant: MEDALLIA, INC., San Mateo, CA (US)

(72) Inventors: Leslie Stretch, San Mateo, CA (US); Krish Mantripragada, San Mateo, CA (US); Ric Smith, San Mateo, CA (US); Ali Sadat, San Mateo, CA (US)

(73) Assignee: Medallia, Inc., San Francisco, CA (US)

( * ) Notice: Subject to any disclaimer, the term of this patent is extended or adjusted under 35 U.S.C. 154(b) by 0 days.

(21) Appl. No.: 16/947,767

(22) Filed: Aug. 15, 2020

(65) Prior Publication Data

US 2021/0056600 A1 Feb. 25, 2021

Related U.S. Application Data

(60) Provisional application No. 62/888,918, filed on Aug. 19, 2019.

(51) Int. Cl.

*G06Q 30/02* (2023.01)
*G06Q 30/0282* (2023.01)
*G06F 3/16* (2006.01)
*G10L 15/26* (2006.01)
*G06F 40/295* (2020.01)

(Continued)

(52) U.S. Cl.

CPC ......... *G06Q 30/0282* (2013.01); *G06F 3/167* (2013.01); *G06F 40/295* (2020.01); *G06Q 10/0637* (2013.01); *G06Q 10/10* (2013.01); *G06Q 30/016* (2013.01); *G06Q 30/0203* (2013.01); *G06Q 30/0205* (2013.01); *G06Q 50/01* (2013.01); *G10L 15/26* (2013.01); *G06N 20/00* (2019.01)

(58) Field of Classification Search

CPC .......................................... G06Q 10/00–90/00

See application file for complete search history.

(56) References Cited

U.S. PATENT DOCUMENTS 8,311,863 B1 * 11/2012 Kemp ................ G06Q 10/0639 705/7.29
10,395,659 B2 * 8/2019 Piercy .................... G10L 15/22

(Continued)

FOREIGN PATENT DOCUMENTS

WO 0225511 A1 3/2002
WO 2014158805 A1 10/2014

OTHER PUBLICATIONS

PCT/US2020/70417 dated Dec. 21, 2020 International Search Report and Written Opinion, 20 pages.

*Primary Examiner* — Arif Ullah

(57) ABSTRACT

Embodiments discussed herein are directed to systems and methods for processing audio feedback on a business, product or service offered and providing the feedback to an associated company in a way that enables the appropriate actors within the company's organizational hierarchy to analyze and take action with respect to the feedback. Customers or employees can interact with a virtual assistant platform or other voice recognition platform to access a feedback service that enables customers or employees to provide feedback to or have a conversation with any business about their product or service. The feedback service can be accessed at any time using a mobile phone or internet connected speaker device using a digital assistant platform.

24 Claims, 12 Drawing Sheets

(51) Int. Cl.

| | |
|---|---|
| ***G06Q 50/00*** | (2012.01) |
| ***G06Q 10/0637*** | (2023.01) |
| ***G06Q 30/0204*** | (2023.01) |
| ***G06Q 10/10*** | (2023.01) |
| ***G06Q 30/0203*** | (2023.01) |
| ***G06Q 30/016*** | (2023.01) |
| *G06N 20/00* | (2019.01) |

(56) References Cited

U.S. PATENT DOCUMENTS

| | | | | |
|---|---|---|---|---|
| 2002/0120554 | A1* | 8/2002 | Vega | G06Q 30/02 705/26.1 |
| 2014/0040748 | A1* | 2/2014 | Lemay | G06F 3/04817 715/728 |
| 2014/0114877 | A1 | 4/2014 | Montano | |
| 2016/0180365 | A1* | 6/2016 | Shi | G06Q 30/0217 705/14.19 |
| 2016/0366545 | A1 | 12/2016 | Yamasaki et al. | |
| 2017/0220943 | A1* | 8/2017 | Duncan | G06N 5/04 |
| 2018/0261203 | A1 | 9/2018 | Zoller et al. | |
| 2019/0050875 | A1 | 2/2019 | McCord | |

* cited by examiner

3:03

One option I found is Four Seasons Hotel San Francisco on Market St.

MAPS

Four Seasons Hotel San Fra...
Hotel · 17 miles
★★★★★ (1928) on TripAdvisor · $$$$

Sanraku Japanese Restaur...
Sushi Bar · 17 miles
★★★★★ (1612) on Yelp · $$

Four Seasons Residences
Real Estate Services · 17 miles
★★★★★ (2) on Yelp

Fours Seasons Nails and Ta...
Nail Salon · 17 miles
★★★★★ (56) on Yelp · $$

Four Seasons Nails and Spa
Nail Salon · 14 miles
★★★★★ (133) on Yelp · $

SYSTEMS AND METHODS FOR REAL-TIME PROCESSING OF AUDIO FEEDBACK

CROSS-REFERENCE TO RELATED APPLICATIONS

The instant application is a nonprovisional patent application that claims the benefit of and priority to U.S. Provisional Patent Application No. 62/888,918, filed on Aug. 19, 2019, which is incorporated herein by reference in its entirety.

TECHNICAL FIELD

The present disclosure relates to systems and methods for processing voice generated audio feedback.

BACKGROUND

With the advancement of computer and network technologies, various operations performed by users from different applications lead to extensive use of web services. This proliferation of the Internet and Internet-based user activity continues to create a vast amount of digital content generated on different platforms. For example, multiple users may provide feedback (e.g., responses to surveys, social media reviews, opinions otherwise expressed during an interaction, etc.) about a business entity or company (e.g., the corporate parent, branch, or subsidiary of a hotel, restaurant, airline, financial institution, a restaurant, etc.) via different applications (e.g., Amazon®, Yelp®, etc.), such as mobile applications running on different platforms, as well as web-interfaces running on different browsers in different operating systems. Furthermore, users may also use different outlets (e.g., Amazon®, Yelp®, FaceBook®, Twitter®, LinkedIn®, etc.) to post their feedback about the business entity or company.

Conventional review or feedback scenarios require the customer to log into a third party feedback service to submit his or her review. For example, if the customer has a bad experience, he may open a review application on his phone and submit a review regarding his recent experience with a particular business. That business may never see that review because the business is not associated with that particular review application, and thus the business may not have the opportunity to learn from the review or take any action in response thereto. Even if the business does monitor reviews posted on the review application, the business may not be able to address the review, e.g., in a contemporaneous manner, thereby potentially alienating the customer.

In other conventional review scenarios, a customer may desire to leave a review "in the moment" without having to wait for the business to solicit feedback, if at all, by sending an email, text, push notification, or some other invitation to submit feedback. Moreover, even when the invitation for feedback is sent, the customer may miss or ignore it because it is no longer "in the moment". If the customer does not provide feedback, the business is not made aware of the feedback and is therefore unable to properly address the issue and improve the customer experience.

SUMMARY

Accordingly, a need has arisen to capture customer and employee experiences with a business, product or service in real-time (i.e. "in the moment"), e.g., audio feedback, and to process the audio feedback in order to derive additional and invaluable information such as emotions, e.g., positive, negative, neutral, happy, sad, angry, upset, etc., being experienced by the customer. It is further desirable to provide the feedback to an associated business entity or company in a way that enables the appropriate remedial actions to be taken. For example, it is desirable to provide the feedback to the company's organizational hierarchy to analyze and take action with respect to the feedback.

A feedback action system and method for processing customer or employee feedback on a business, product or service provided by a particular business entity or company and providing the feedback to an associated company in a way that enables the appropriate actors within the company's organizational hierarchy to analyze and take action with respect to the feedback is provided.

In one embodiment, a computer-implemented method is provided for managing a plurality of client accounts, wherein each client account comprises a generic response feed and at least one location-specific response feed; receiving audio feedback via a virtual assistant or other voice recognition (or STT) platform, the audio feedback including a description of an interaction with a business, product, or service; determining at least one of a business name and a business location in connection with the received audio feedback; identifying the client account associated with the business name and the business location; and posting the feedback to the location-specific response feed associated with the identified client account when the business name and business location are known.

In another embodiment, a computer-implemented method is provided for receiving audio feedback related to a feedback target from a customer; determining a business entity corresponding to the feedback target; determining a user profile associated with the customer; and providing the received audio feedback and the user profile to the business entity.

In yet another embodiment, a computer-implemented method is provided for initiating a voice assistant that solicits feedback related to a service or product provided by a feedback target; soliciting feedback from a customer by asking the customer a series of questions, the questions are designed to acquire a business name and a business location; in response to receiving voice identification of the business name and the business location, displaying a list of potential businesses that correspond to the business name and the business location; in response to receiving user selection of a feedback target from the list of potential businesses, displaying a page comprising a plurality of selectable elements, including a feedback element; in response to receiving user selection of the feedback element, prompting the user to provide feedback for the feedback target; and receiving voice feedback of the feedback target.

These and other features and aspects of the concepts described herein may be better understood with reference to the following drawings, description, and appended claims.

BRIEF DESCRIPTION OF THE DRAWINGS

The present application can be best understood by reference to the figures described below taken in conjunction with the accompanying drawing figures, in which like parts may be referred to by like numerals.

FIG. 6A shows in illustrative screen shot according to an embodiment.

DETAILED DESCRIPTION

Figure 1:
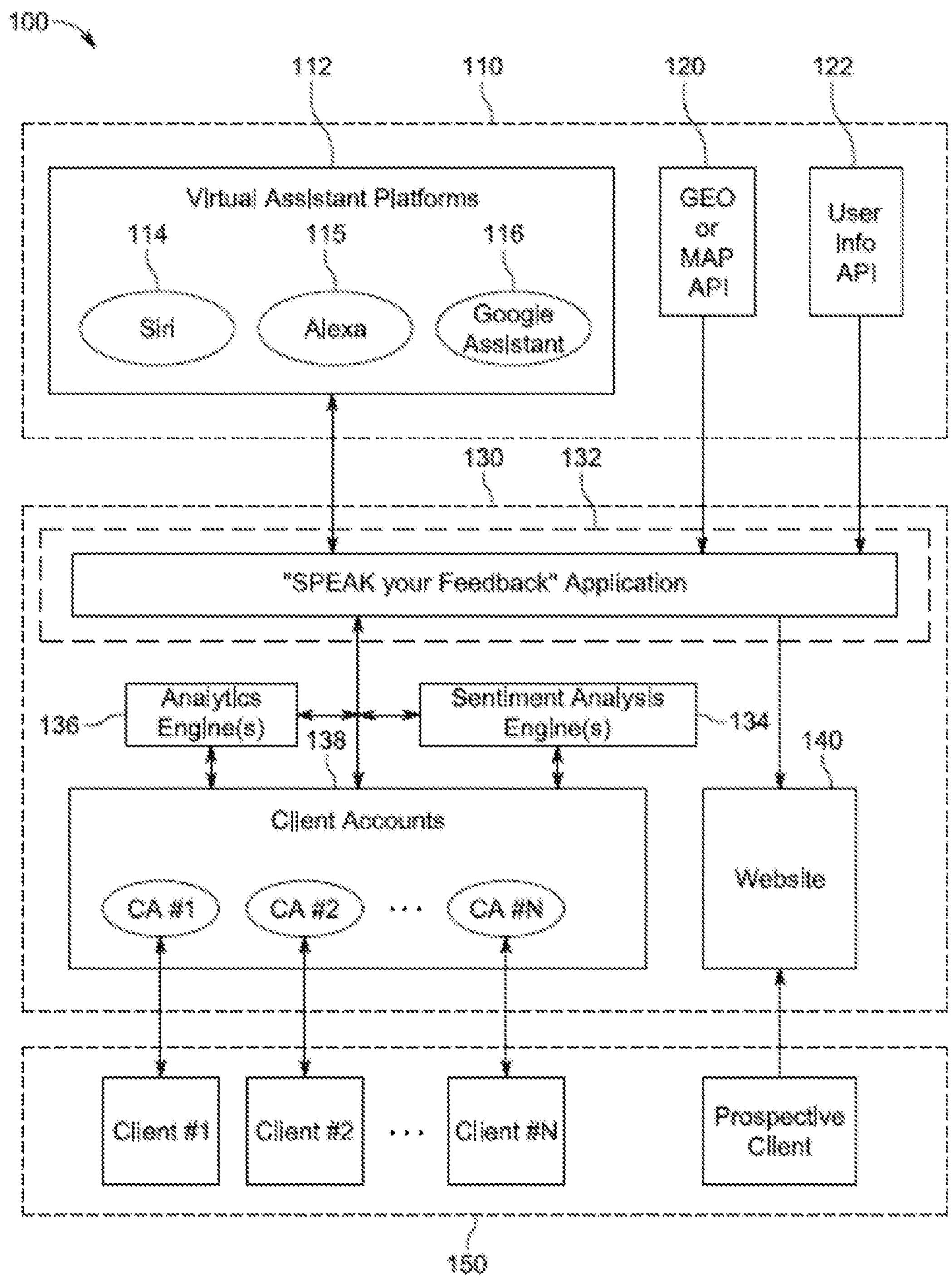
FIG. 1 shows an illustrative block diagram of an audio feedback action system according to an embodiment.

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying", "rendering", "utilizing", "launching", "calling", "merging", "starting", "accessing", "sending", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Conventionally, businesses, whether selling products or services, ask their customers for their feedback in order to improve their products/services. Collecting customer feedback has traditionally been laborious and difficult. For example, hotel guests were asked whether they enjoyed their stay or a physical suggestion box for hotel guests was available for them to physically deposit their comments. Alternatively, some hotel guests may have been mailed feedback forms with the hope that they may be filled out and returned, and even if feedback forms were filled out they were inaccurate in nature because they were not collected in real time and as such inaccurate due to guests' memory fading. Furthermore, feedback collected not in real time often do not capture the real-time emotions experienced by customers. For example, customers often calm down over time after a horrible experience whether due to poor service or inferior product, however it may nonetheless be desirable to capture that emotion in real time as feedback that is a true indication of what is being experienced by the customer in order to properly address those real-time experiences and improve customer experience in the future. Unfortunately, traditional feedback collection has been far from ideal and inaccurate As such, it is very little help in improving customer experience, whether for the service being provided or product being sold. Moreover, written feedback often fails to do justice in capturing the true emotions being experienced by customers in real time. Similarly, employees of an entity may be solicited to provide feedback to improve the work environment and to increase efficiency, but they also suffer from the failures discussed above.

With the advent of technology and particularly Internet-based technology, collecting feedback, and in particular in real time, has become easier. For example, customers may now provide feedback in real time as it is being experienced by writing a review on Yelp® as they are dining at a restaurant or as they stay as a hotel guest with a push of a button. Unfortunately, though feedback may be being collected through various applications, e.g., different operating systems, and platforms, e.g., different social media platforms, collection is not under the control of the business entity itself. As such, a Yelp® review cannot be addressed by a business unless the business entity captures the reviews from Yelp®.

Embodiments discussed herein are directed to systems and methods for capturing audio feedback and for processing the captured audio feedback. Audio feedback is not only accurate because it can be collected in real time but it also captures the true emotions being experienced by customers, which can later be processed and analyzed in order to improve customer experience. In other words, the audio feedback address the shortcomings of the conventional feedback system by collecting feedback in real time and further by capturing the true emotion as expressed in the audio feedback, and further by processing the audio feedback in order to take appropriate remedial steps. It is appreciated that the audio feedback may be customer feedback on a business, product or service in audio form. It is appreciated that the audio feedback may be provided to an associated company in a way that enables the appropriate remedial steps within the company's organizational hierarchy to be taken. For example, the audio feedback may be analyzed in order to determine the appropriate action to be taken with respect to the audio feedback.

It is appreciated that 'feedback' as described herein, refers to criticism or praise regarding an interaction a customer or employee had with a business, product, or service, as an example. In some embodiments, the feedback may include a review of a business, product or service or any combination thereof. It is appreciated that in some nonlimiting embodiments, feedback may include metadata derived from prosodic and/or acoustic feature(s) of a user's voice, thereby capturing the real emotions being experienced by the user. It is appreciated that in some nonlimiting examples, feedback may be a description of an experience, that the user had with a particular business, including that business' products, services, or other offerings. In some nonlimiting embodiments, feedback may be a description of an experience an employee had with their employer (such as an experience with their manager). Throughout this patent application, feedback may be directed to a business entity or company (e.g., the corporate parent, branch, or subsidiary of a hotel, restaurant, airline, financial institution, or a restaurant), and the terms 'company' and 'business entity' may be used interchangeably. Throughout this patent application, the role of a 'customer' may be replaced by an employee and they may be referred to as a 'user' in general. In some embodiments, feedback may be received from both employees or customers or any combination thereof. In fact, the use of the terms 'customer', 'employee', etc., that provide feedback may be used interchangeably and may generally be referred to as users throughout this application.

Customers can interact with a virtual assistant platform or other voice recognition platform to access a feedback service that enables customers or employee to provide feedback, e.g., audio feedback, to or have a conversation with any company about their business, product or service. The feedback service can be accessed at any time using a mobile phone or internet connected speaker device using a digital assistant platform such as Alexa®, Google Assistant®, Siri®, etc. This enables customers to provide "in the moment" feedback about a business, product or service associated with a particular business, including a business at a particular location. It is appreciated that "in the moment" audio feedback can further be used to capture the true emotions of the customers being experienced in real time. For example, the customer can say "Talk to Medallia Service" using the digital assistant platform to initiate a feedback session. The feedback service may engage the customer in a dialog to obtain information pertaining to the business name, business address, and the customer's feedback. The feedback service can process the customer's audio feedback to derive the true emotions being experienced by the customer as well as capturing other information (e.g., location information and user contact information) and route the feedback to the appropriate entity for appropriate steps to be taken, according to various embodiments discussed herein. For example, if the business is a client of the feedback service, the feedback service can post the feedback to a response feed so that the business can assess the feedback, e.g., derive the emotions being experienced by the customer of the business, and take appropriate action to close the loop with respect to the customer. In some embodiments, the business can take real-time action in response to the customer feedback by directly engaging with the customer contemporaneously with the customer's audio feedback submission. If the business is not a client of the feedback service, the feedback service can post the feedback to a publicly accessible website.

The feedback service can leverage sentiment analysis modeling engines to evaluate the voice-to-text language strings (and/or acoustic/prosody-derived metadata) supplied by the virtual assistant or voice recognition platform. The sentiment analysis modeling engines can include a universal sentiment analysis modeling engine and client specific sentiment analysis modeling engines for assessing sentiment in the text strings. The feedback service can also leverage and populate data structures that correlate feedback to a particular client subscribed to the feedback service or to a prospective client. The data structures can ensure that the appropriate actors within a client's organizational hierarchy are tasked with actions relating to particular feedback and enable a large array of analytics to be performed on the feedback, individual actors within the organization, a division or subgroup within the organization, a business location, or the business as a whole.

FIG. 1 shows an illustrative block diagram of audio feedback action (AFA) system 100 according to an embodiment. AFA system 100 can be arranged in three general categories: customer device 110, feedback service 130, and clients 150. Customer device 110 can represent the customer facing interface or device used by the user to provide audio feedback. For example, the interface or device can be a mobile device such as a phone or tablet, an accessory such as a watch, a laptop computer, a desktop computer, or any other device capable of processing or ingesting speech. The device can run virtual assistant platform 112 such as Siri® 114, Alexa® 115, Google Assistant® 116, or other application capable of processing speech. Virtual assistant platform 112 may be capable of understanding speech spoken by the user of customer device 110 and provide text strings (and/or metadata) to feedback service 130 for further processing in accordance with embodiments discussed herein. The device 110 can include different application programming interfaces (APIs) that share information among applications running on the device and with applications that are hosted remote from the device such as feedback service 130. Specific examples of APIs can include GEO or MAP APIs 120 (e.g., APIs that provide geographic location of the user's device or access a map application, including search features) and User information API 122 (e.g., an API that can provide contact information pertaining to the user of the device such as name, phone number, email address, etc.).

It is appreciated that the audio feedback captured by the device 110 may be analyzed by the device 110 to derive the real emotions being experienced by the user, e.g., through sentiment analysis, speech emotion recognition TensorFlow®, speech emotion recognition GitHub®, audio sentiment analysis python, etc. It is appreciated that the real emotions, as derived by the device 110, may be provided to the feedback service 130 for further processing. It is appreciated that in some nonlimiting examples, the audio feedback is provided to the feedback service 130 in audio format, such that the audio feedback can be converted into text strings (and/or metadata) and where the real emotions being experienced are derived therefrom by the feedback service 130. Accordingly, it is appreciated that the description of the embodiments with respect to the device 110 providing the text strings (and/or metadata) to the feedback service 130 is for illustrative purposes only and should not be construed as limiting the scope of the embodiments. Furthermore, it is appreciated that the analysis of the audio feedback to derive the real emotions being experienced by the customers can be done by the device 110 and/or the feedback service 130. In some nonlimiting examples, emotion-related data can be derived from the audio feedback through various machine learning (ML) and artificial intelligence (AI) algorithms.

Feedback service 130 can include one or more servers and databases for running feedback service engine 132, running sentiment analysis engine(s) 134, running analytics engine(s) 136, and for maintaining client accounts 138. It is appreciated that the sentiment analysis engine 134 may use natural language processing, text analysis, computational linguistics, biometrics, etc. to effectively identify and extract the relevant information from audio feedback, as an example, in order to take appropriate remedial actions. For example, the sentiment analysis engine 134 may classify the polarity within a given audio feedback, e.g., positive, negative, neutral, angry, sad, happy, etc. Feedback service engine 132 may run an application that interfaces with customer device 110, and in particular with virtual assistant platform 112, to receive text strings (and/or metadata) from customer device 110 that are related to customer feedback and determine how to classify, e.g., positive, negative, neutral, angry, sad, happy, etc., and store the feedback. If the feedback is associated with a business that has a client account with feedback service 130, that feedback may be associated with the appropriate account in client accounts 138. If the feedback is associated with a business that does not have a client account with feedback service 130, the feedback may be posted, e.g., in audio format, in text format, etc., to feedback website 140.

Feedback service engine 132 may access sentiment analysis engine(s) 134, analytics engine(s) 136, databases (not shown), and other text and/or data analysis engines to evaluate text strings and/or metadata received from customer device 110 or in some nonlimiting examples, the actual audio feedback in its entirety. The analysis of the text strings and/or metadata and/or the actual audio feedback can enable feedback service engine 132 and/or analytics engine(s) 136 and/or sentiment analysis engine(s) 134 to classify the feedback quickly and accurately and to generate the appropriate data set for inclusion with client accounts 138 or feedback website 140.

Clients 150 may represent different paying clients that have accounts with feedback service 130 and prospective clients. Paying clients can access their respective accounts in client accounts 138. In some embodiments, paying clients can directly interface with the user at customer device 110 using feedback service 130. In other embodiments, paying clients may be provided with the customer's contact information so that the appropriate actor within the business can contact the customer and "close the loop" with respect to the customer's feedback. The paying clients can also run reports and perform analytics by interacting with a user interface hosted by feedback service 130. Prospective clients can access feedback website 140 to read feedback being captured as speech. The prospective clients can be presented with an invitation or link to subscribe to feedback service 130 when viewing feedback directed to their business.

Clients 150 can perform close-the-loop feedback actions in response to receiving the feedback from feedback service 130. Closed loop feedback can be a process by which feedback from customers is provided to employees of a client company and action is taken to respond to the feedback, and action can be taken to improve core processes, products, and business operations. In some embodiments, the closed loop feedback can include an inner loop process and an outer loop process.

The inner loop process can result in action in response to feedback from a unique individual or customer. The inner loop feedback process may promote individual or team-level learning and change. The inner loop feedback process can route feedback from customers directly to employees, enable employees to follow up with customers regarding the feedback to gather additional information, and identify and execute on actions and coaching needs.

The outer loop process can be an action to address systematic, business/industry level issues. The outer loop feedback process can refer to a process by which learning and feedback from the inner loop are aggregated, analyzed, and prioritized to address broader and systematic improvements that go beyond the individual or team. For example, the systematic improvements can involve new policies, processes, technology, pricing, and product features.

The closed loop feedback can also include an account loop, or a business-to-business loop that is designed to provide a more complete view of customer relationships. The account loop may include an action at the account level to engage the customer using aggregated feedback. The account loop may be designed to identify actions to improve individual relationships, provide insight into the level of risk of customer churn, and identify promoters that can help generate additional business.

It is appreciated that consumer device 110, feedback service 130, and clients 150 may communicate via a network (not shown). The network can include any suitable network for transmitting data from one location to another. For example, the network can include the Internet, wide area networks, local area networks, telephony data transmissions, WiFi, etc.

Figure 2:
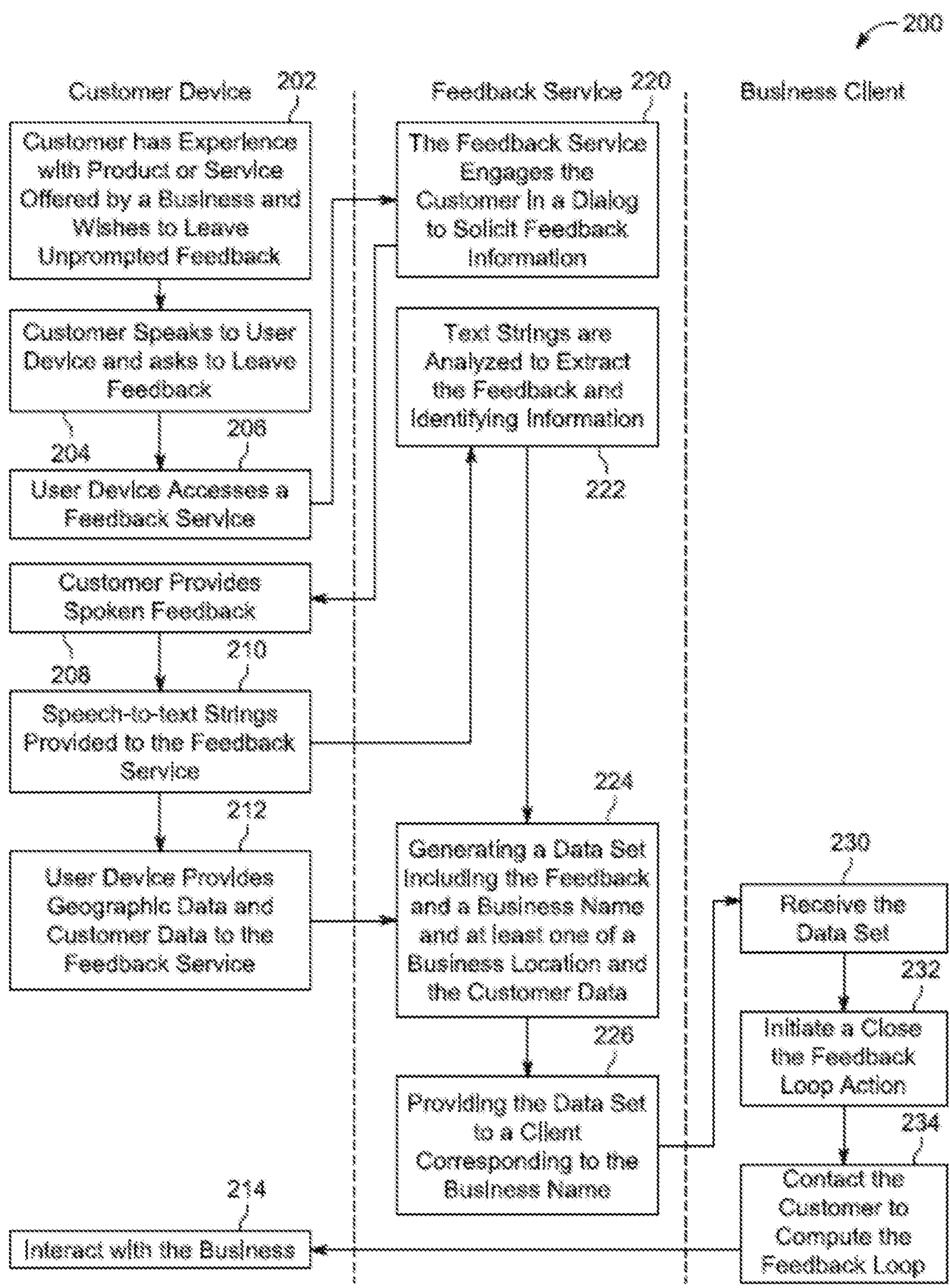
FIG. 2 shows an illustrative feedback process according to an embodiment.

FIG. 2 shows an illustrative feedback process 200 using AFA system 100 according to an embodiment. Process 200 is arranged in three different columns: Customer, Feedback service, and Business Client to correlate with customer device 110, feedback service 130, and clients 150 of FIG. 1. Steps performed within a particular column are generally executed by the equipment associated with that column. Starting at step 202, a customer has experience with a product or service offered by a business and wishes to leave unprompted feedback. The unprompted feedback refers to feedback in which the customer decides to leave feedback "in the moment" and is not necessarily providing the feedback in response to an invitation (such as an email or SMS invitation) or a reminder. In some instances, however, the customer can still use process 200 to leave feedback if prompted or reminded to provide feedback, and by using process 200, the customer can provide spoken feedback and the feedback service is still able to process the feedback and provide it to the appropriate business client so that the client can take appropriate corrective action. At step 204, the customer speaks to his or her user device and asks the device to leave feedback. For example, the user device may be running a virtual assistant that is capable of processing speech. The user device may access feedback service (step 206) in response to the customer request to leave feedback. In other embodiments, the customer may open an app that accesses the feedback service and can convert speech to text. It is appreciated that the conversion of speech to text by the user device is provided for illustrative purposes and should not be construed as limiting the scope of the embodiments. For example, the audio feedback may be provided from the user device directly in its entire form to the feedback service.

At step 220, the feedback service may engage the customer in a dialog to solicit feedback information from the customer. The feedback service may provide real-time questions to the customer based on customer responses, or the feedback service may follow a set of scripted questions. In some embodiments, the feedback service may preload the questions on to the user device to provide a fast and seamless interaction. The customer may provide spoken and other feedback at step 208. The user device can convert the speech to text and provide the text strings to the feedback service (as step 210). As discussed above, the speech-to-text conversion may be performed by the feedback service in some nonlimiting examples.

The text strings are analyzed to extract the feedback and identifying information at step 222. In some embodiments, this analysis may include analyzing the text string to determine, without limitation, sentiment, suggested actions, customer and/or employee intention, themes, emotions, and/or topics. The identifying information can include a business name, a business location, a product name, or a type of service received, a name of a service adviser or business representative, or any other information that may be spoken by the customer.

At step 212, the user device can provide geographic data and customer data to the feedback service. The user device may provide this data to the feedback service while the customer is providing his or her feedback. The geographic data may be used to corroborate a business location with the location of the user device or to ascertain the location of the business the user is providing feedback about. The user data may include contact information (e.g., name, email address, phone number, etc.) that is stored as part of the customer's profile on his or her device. In some embodiments, the user data may only be transmitted if the customer has registered to interact with the feedback service.

At step 224, the feedback service can generate a data set based on the received text strings and optionally can be further generated based on the received geographic data and/or customer data. The data set can include the feedback and a business name and at least one of a business location and the customer data. The data set can include additional information that is client specific, examples of which are discussed below in connection with the Units discussion. The data set can be provided to a client corresponding to the business name, at step 226. It is appreciated that in some nonlimiting examples the feedback service generates a data set, as described above, based on the received audio feedback and/or the received geographical data and/or customer data. In other words, the feedback service may receive audio feedback instead of the text strings associated with the audio feedback. As such, the audio feedback may be converted into text by the feedback service instead of the user device. It is appreciated that as described with respect to FIG. 1, the audio feedback may be analyzed in order to identify the emotions of the customers being experienced, e.g., happy, sad, angry, etc., and the audio feedback may be classified accordingly, e.g., positive, negative, neutral, etc.

At step 230, the client can receive the data set. Receipt of the data set can trigger action by the client to initiate a "close the feedback loop" action, as indicated at step 232. As part of closing the feedback loop, the business client can contact the customer at step 234. The customer may interact with the business at step 214.

It should be understood that the steps shown in FIG. 2 are illustrative and should not be construed as limiting the scope. For example, the described steps may be performed in a different chronological ordering (rearranged) and additional steps may be added and/or removed.

Figure 3:
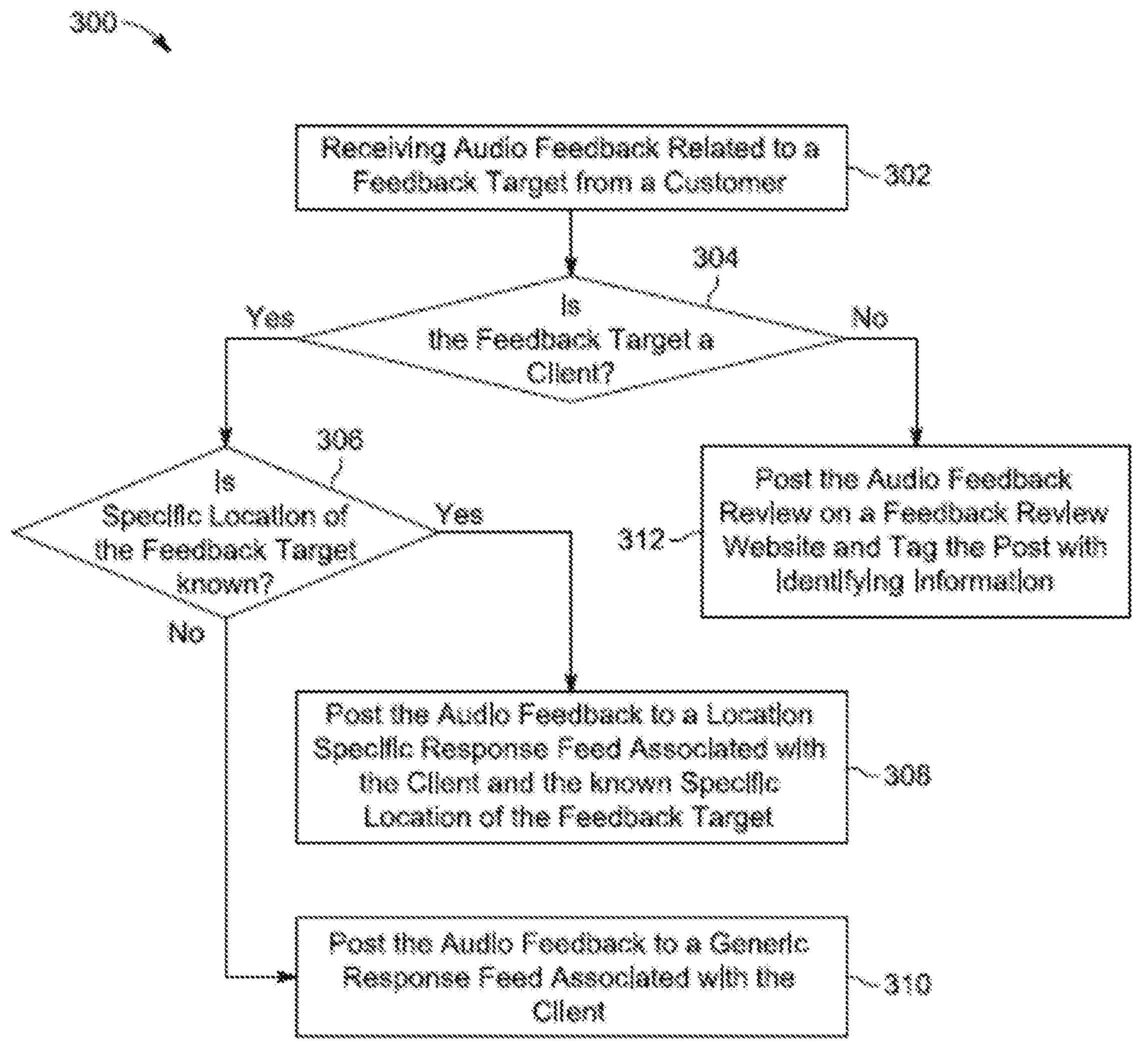
FIG. 3 shows illustrative process for how the feedback service decides where to route feedback according to an embodiment.
Figure 4:
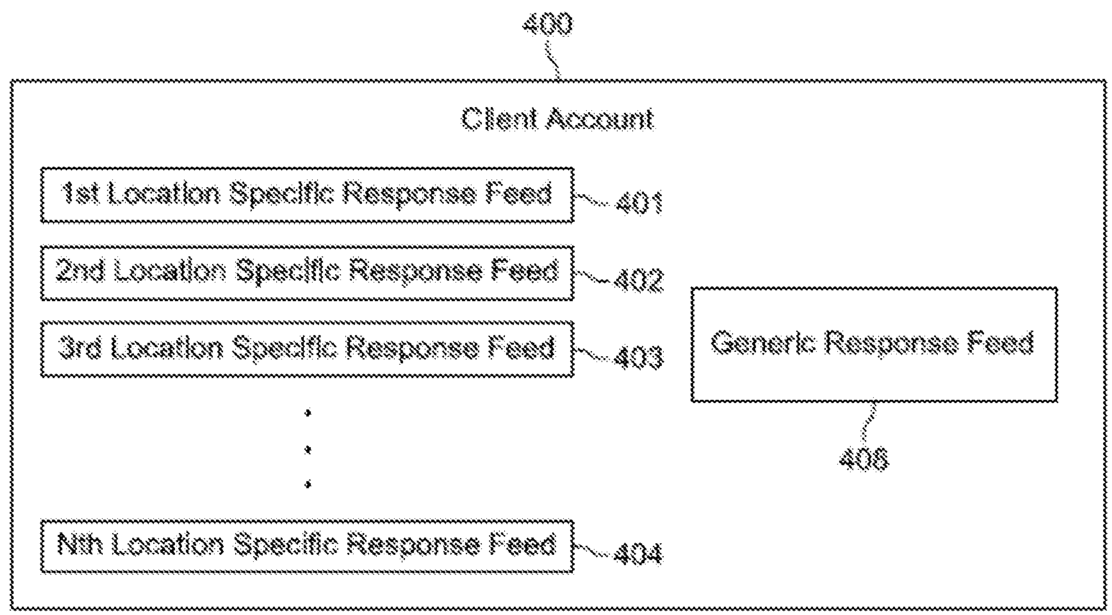
FIG. 4, which shows illustrative client account with several location-specific response feeds according to an embodiment.

FIG. 3 shows illustrative process 300 for how the feedback service decides where to route feedback according to an embodiment. Starting at step 302, audio feedback related to a feedback target is received from a customer. The feedback target is a business, but the feedback service may not yet have determined what business is associated with the feedback target. After the business name is obtained from the audio feedback, geo information, or other information, the feedback service can determine whether the feedback target is a client of the feedback service at step 304. If the determination at step 304 is YES, process 300 may determine if the specific location of the feedback target is known, at step 306. If the determination at step 306 is YES, the audio feedback, or text equivalent thereof, can be posted to a location-specific response feed associated with the client and known specific location of the feedback target. Refer now briefly to FIG. 4, which shows illustrative client account 400 with several location-specific response feeds 401-404 and a generic response feed 408.

Client account 400 may be associated with each client of the feedback service. Some clients may have multiple locations (e.g., stores or service areas) and each location may have its own location-specific response feed. This way, when the feedback service routes the audio feedback of the feedback target to the business, the audio feedback can be routed to the business client with a level of specificity that enables the ideal business employee or business group at the business to be presented with the audio feedback and take any action necessary. This can help promote speed and efficiency for enabling the business to handle the feedback, as well as providing the business with the opportunity to contact the customer in real-time or at a time that is substantially contemporaneous with the customer's feedback submission.

Referring back to FIG. 3, the feedback service can generate data sets based on audio feedback, the business name, the business name, the customer information, or any combination thereof. This data set can be a unit as discussed above. In some embodiments, a unit may only be generated if the business name and the business location are known. Thus, according to this embodiment, if the determination at step 306 is YES, the feedback service may generate a unit for this particular feedback and provide it to the client's account and route the unit to the correct location-specific response feed.

If the determination at step 306 is NO, then the location is not known, but the business is a client, the feedback is routed to the appropriate client account and is posted to that client's generic response feed (e.g., generic response feed 408). By posting to the generic response feed, the client is provided with the opportunity to task a close-the-loop action item. In some embodiments, a Unit may not be created in response to a NO determination at step 306. Referring back to step 304, if the determination here is NO, the feedback service can post the audio feedback on a feedback website and tag the post with identifying information.

It should be understood that the steps shown in FIG. 3 are illustrative and should not be construed as limiting the scope. For example, the described steps may be performed in a different chronological ordering (rearranged) and additional steps may be added and/or removed.

Figure 5:
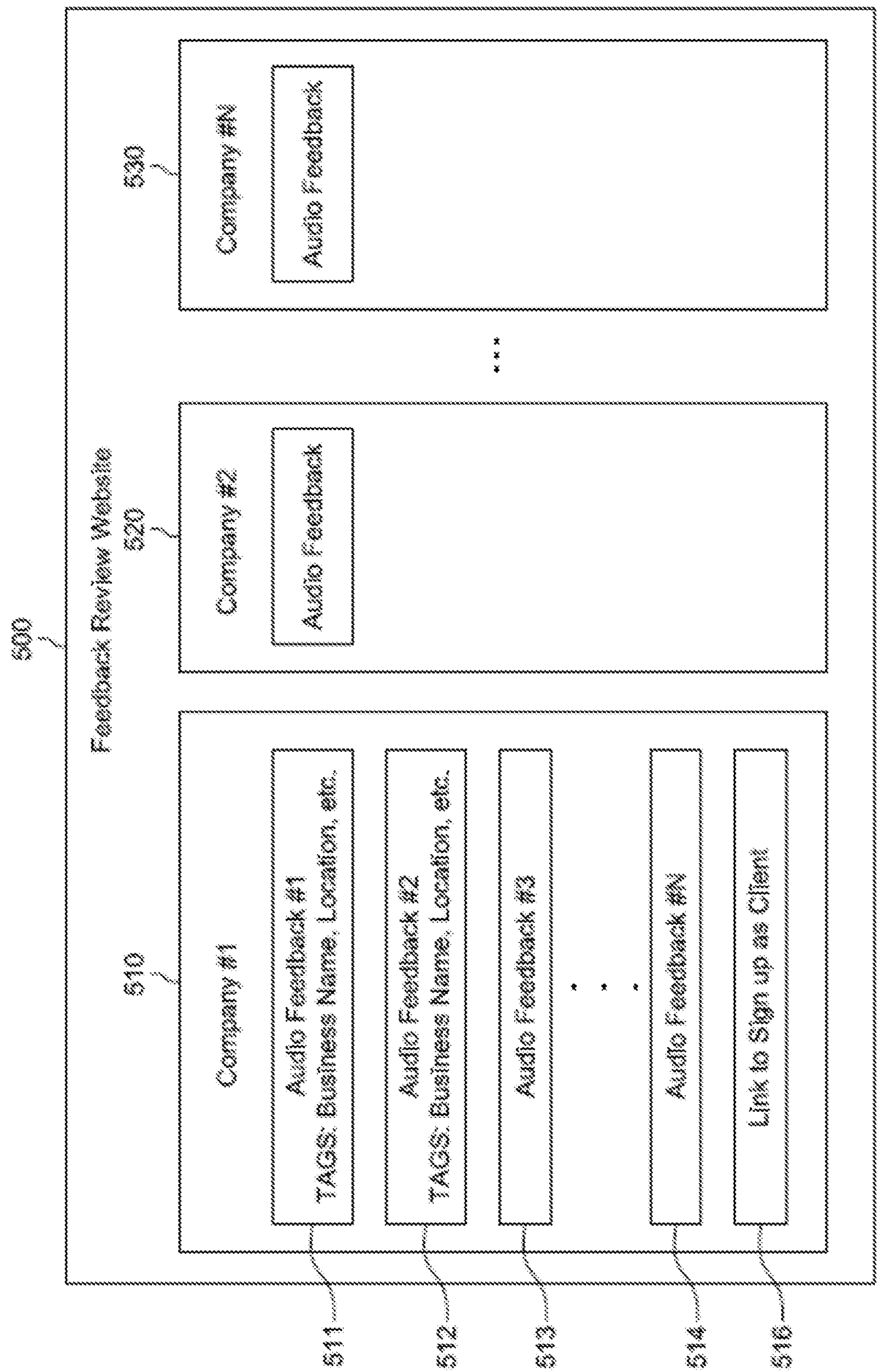
FIG. 5 shows an illustrative feedback website according to an embodiment.

FIG. 5 shows an illustrative feedback website 500 according to an embodiment. Website 500 can be managed by the feedback service, which can organize the website according to different company pages, such as company pages 510, 520, and 530. Each company page include individual audio feedback postings such as postings 511-514 and link 516 that can serve as an invitation to the company associated with those postings to subscribe to the service.

Figure 6:
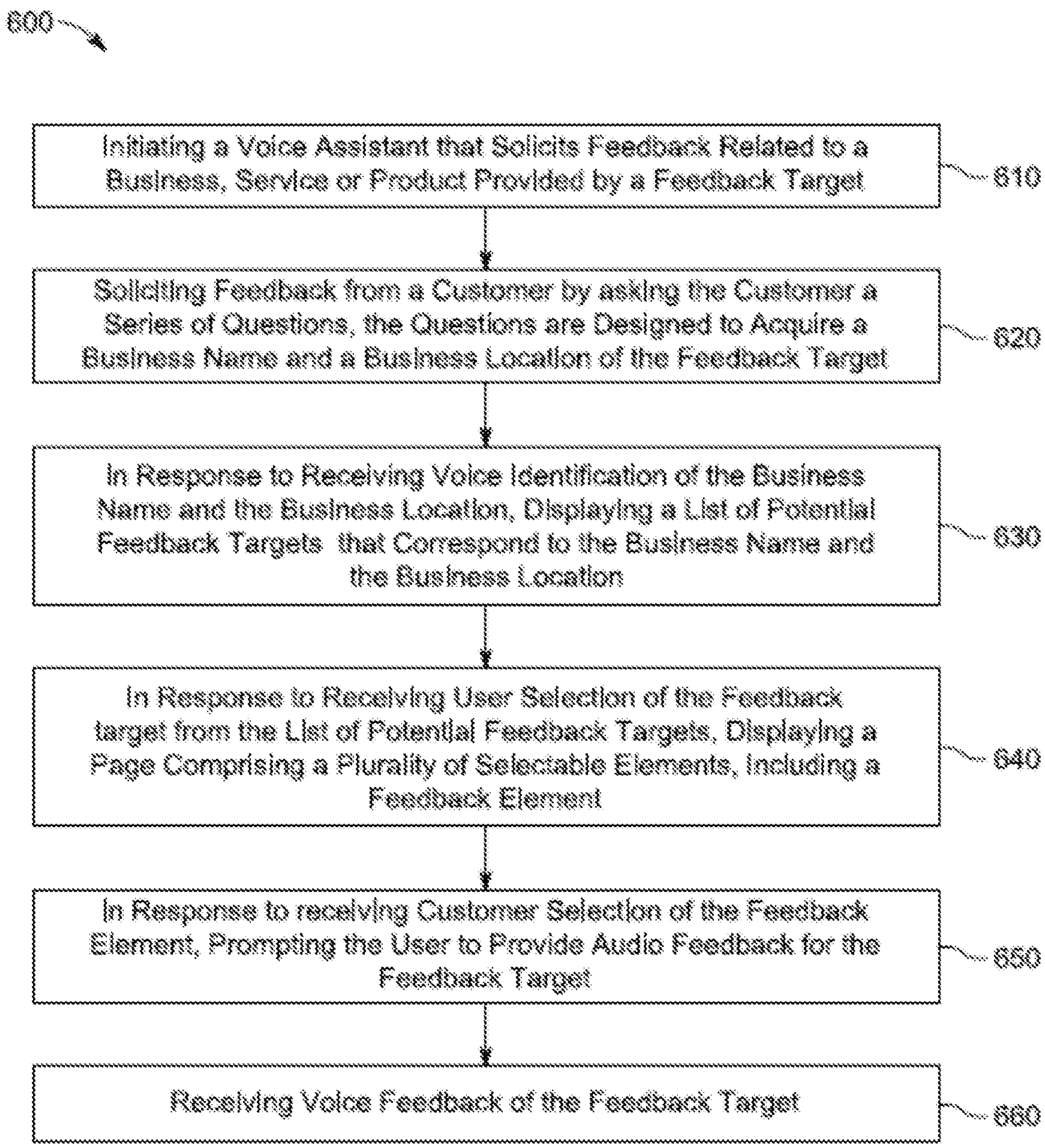
FIG. 6 shows an illustrative process for providing audio feedback according to an embodiment.

FIG. 6 shows illustrative process 600 for providing audio feedback according to an embodiment. Process 600 can begin at step 610 by initiating a voice assistant that solicits feedback related to a service or product provided by a feedback target. For example, a customer can state, "Hey [name of virtual assistant platform], I want to leave feedback" to initiate the voice assistant to leave feedback. At step 620, feedback can be solicited from the customer by asking the customer a series of questions. The questions are designed to acquire a business name and a business location of the feedback target. For example, a typical exchange may go as follows: Virtual Assistant: "Feedback service here, how can I help you?" Customer: "I have feedback for a target." Virtual Assistant: "Do you have feedback for a specific target location?" Customer: "Yes, that target at location X."

Figure 6B:
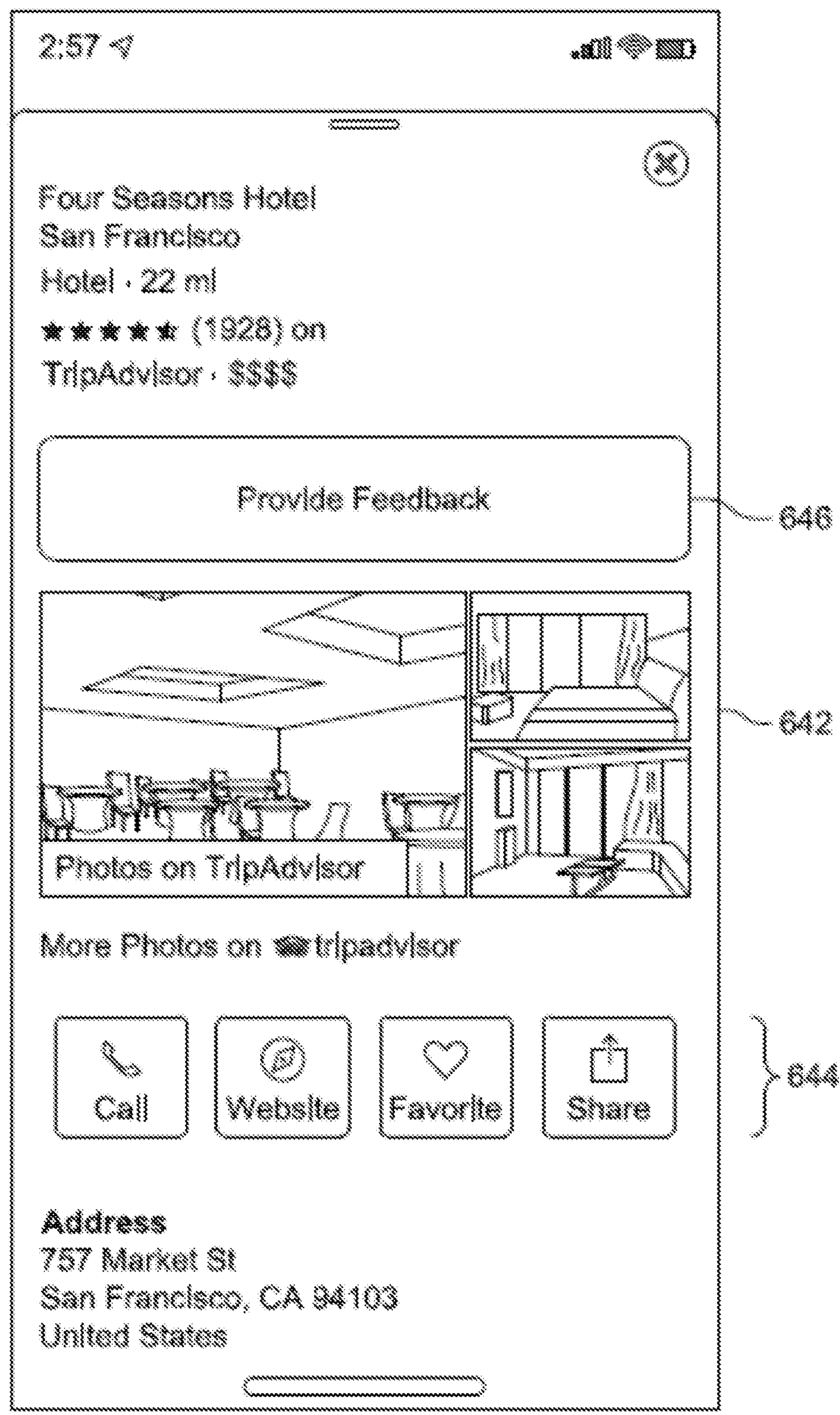
FIG. 6B shows another illustrative screen shot according to an embodiment.

At step 630, in response to receiving voice identification of the business name and the business location, the feedback service may leverage various APIs such as a Map API or GEO API to locate and cause a list of potential feedback targets that correspond to the business name and the business location to be displayed on the customer's device. For example, the customer may be presented with list 632 of FIG. 6A. In response to receiving user selection of the feedback target from the list of potential feedback targets, a page including several selectable elements, including a feedback element, can be displayed at step 640. For example, the customer may be presented with page 642 of FIG. 6B. Page 642 include elements 644 and feedback element 646. In response to receiving user selection of the feedback element, the customer can be prompted to provide audio feedback for the feedback target (at step 650). For example, after the user presses feedback element 646, the Virtual Assistant can state, "Please provide your feedback for [business name] at [business location]." At step 660, voice feedback of the feedback target is received from the customer. After the customer finishes providing his or her voice feedback, the Virtual Assistant can confirm that the feedback will be provided to the feedback target. For example, the Virtual Assistant can state, "Thank you for your feedback, we will provide this feedback to [business name] at [business location].

It should be understood that the steps shown in FIG. 6 are illustrative and should not be construed as limiting the scope. For example, the described steps may be performed in a different chronological ordering (rearranged) and additional steps may be added and/or removed.

The feedback service can access databases and data sets contained therein, and generate data sets based on new feedback, including audio feedback received according to embodiments discussed herein. The data sets can include Units that are used to link feedback records with a customer and a client. Units are part of a business client (i.e., business actors such as front-line representatives, call center agents, and employees, physical locations such as brick and mortar locations or geographic coverage areas, or websites). Units can represent a common node within a client organization as it relates to feedback and reporting because every interaction is between a customer and a Unit. In the embodiments discussed herein, Units can be created when a customer interacts with a virtual assistant to leave feedback.

Each Unit can include name that is displayed on a user interface or reports. Each Unit can include a unique identifier. The unique identifier can identify the Unit the customer interacted with and can be used to categorize the interaction within the client organization. Each Unit can include a street address, including city, state or country, and zip code where the Unit is located. In some embodiments, when the Unit is a call center, the street address for that type of Unit may be empty. Each Unit may be marked as active or inactive. Inactive units may be included in reports and used in data analytics but filters may not display inactive units.

Each Unit can include a data fields, geocoding, and administrative functions. Unit data fields are attributes unique to a particular Unit, such as, for example, a Unit's name or email address. Unit data fields can be shared with other Units and can be used to analyze feedback records in relation to a client business organizational hierarchy (e.g., department, business group, or tenure). Data field can include a name, which is a human-readable label that shows up on reports, and a keyname, which is a unique programmability reference. Geocoding may transform an address into a location on the Earth's surface as identified by latitude and longitude coordinates. In some embodiments, the street address may be converted to geo coordinates and stored as such in the Unit. The administrative functions may provide advanced and additional properties of a Unit. For example, the advanced features may include geo coordinates and a state of the Unit. The state include an active state (which means the Unit is active and all data is available for access), an inactive state (which may correspond to business actors that are no longer active such as a shuttered store or termed employee, but the data shows up in reports or analysis), and a deleted state (which marks the Unit as deleted and data associated therewith is excluded from reporting and analysis).

Each Unit can include unit groups that classify a Unit's place within a client organization such as for example, a sales district or territory, a line of business, a geographical location, time zone, managerial level, business group, subsidiary, etc. Unit groups can enable user to filter and analyze data according to organizational lines. Unit groups can include unit group data fields that are attributes of unit groups. Clients can custom program the group data fields. For example, customers can program bulk groups.

Unit group can also include hierarchies that are defined by the customer. For example, companies typically organized groups along business hierarchies. This may enable the business to run reports according to any desired hierarchical level. The hierarchy can be geographically based such as by district and region or Country, State, and City, or org chart based such as by Vice President, Director, Manager, and Employee.

Figure 7:
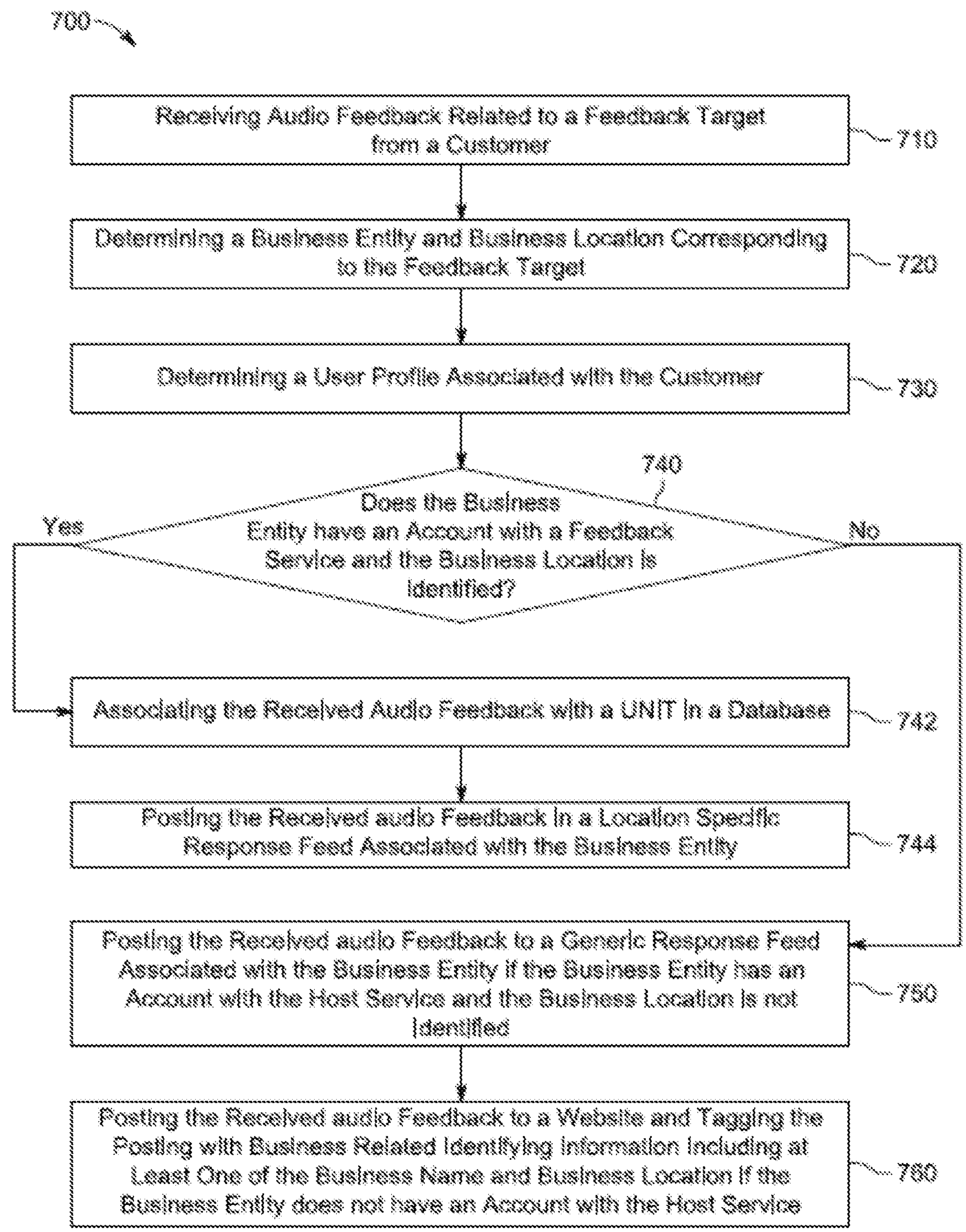
FIG. 7 shows another illustrative process according to an embodiment.

FIG. 7 shows illustrative process 700 for processing audio feedback and routing to the appropriate client according to an embodiment. Process 700 can begin at step 710 by receiving audio feedback related to a feedback target from a customer. A feedback service can determine (at step 720) a business entity and business location corresponding to the feedback target. The feedback service can do this by evaluating the speech-to-text provided by a speech-to-text platform. In another approach, the feedback service may leverage map APIs or geolocation API to identify and match the feedback target to the business entity and business location. The feedback service can also determine a user profile associated with the customer, at step 730. At step 740, a determination of whether the business entity has an account with a feedback service and the business location is identified. If the determination at step 740 is YES, the received audio feedback can be associated with a Unit in a database (at step 742). For example, the Unit can be the same as the Unit discussed above and can connect the audio feedback and the customer to a business hierarchical element within the client organization. In addition, the received audio feedback can be posted in a location-specific response feed associated with the business entity, at step 744.

If the determination at step 740 is NO, then if at step 750 the business entity has an account with the host service and the business location is not identified, the received audio feedback can be posted to a generic response feed associated with the business entity. At step 760, if the business entity does not have an account with the host service, the received audio feedback can be posted to a website and that posting can be tagged with business related identifying information including at least one of the business name and business location.

It should be understood that the steps shown in FIG. 7 are illustrative and should not be construed as limiting the scope. For example, the described steps may be performed in a different chronological ordering (rearranged) and additional steps may be added and/or removed.

Figure 8:
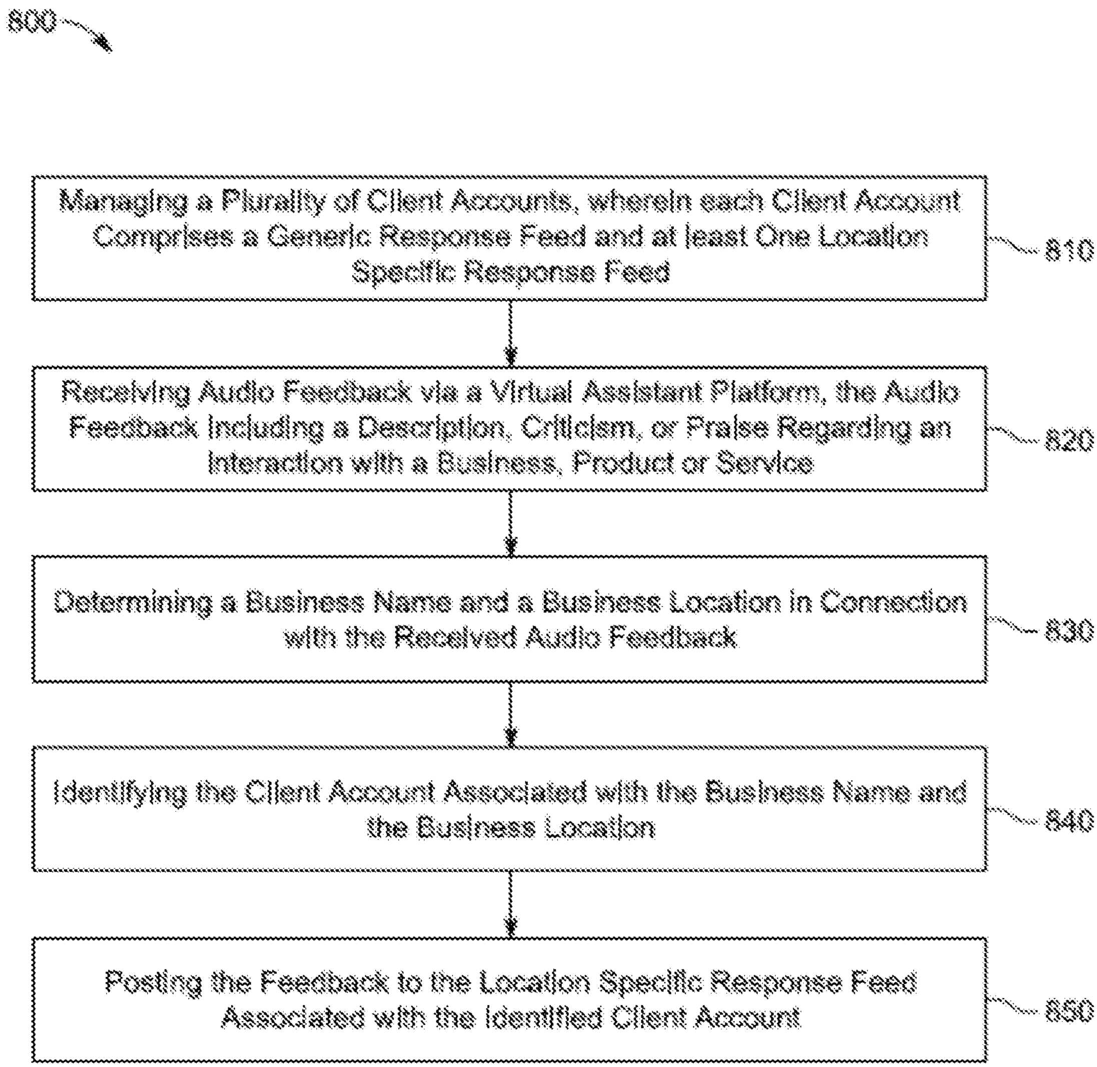
FIG. 8 shows yet another illustrative process according to an embodiment.

FIG. 8 shows an illustrative process 800 according to an embodiment. Process 800 may begin at step 810 by managing a plurality of client accounts, wherein each client account includes a generic response feed and at least one location-specific response feed. At step 820, audio feedback can be received via a virtual assistant platform. The audio feedback can include a description, criticism, or praise regarding an interaction with a business, product, or service. At step 830, a business name and a business location in connection with the received audio feedback can be determined. At step 840, the client account associated with the business name and the business location can be identified. It is appreciated that, as described above, emotions associated with the audio feedback can be derived. At step 850, the feedback can be posted to the location-specific response feed associated with the identified client account.

It should be understood that the steps shown in FIG. 8 are illustrative and should not be construed as limiting the scope. For example, the described steps may be performed in a different chronological ordering (rearranged) and additional steps may be added and/or removed. For example, in some embodiments, the audio feedback can be replaced by another form of feedback such as email, social media posting (e.g., Twitter, Facebook, Instagram), or telephone call process 800 can treat the other form of feedback in a manner similar to how it handles audio feedback provided by the customer.

Figure 9:
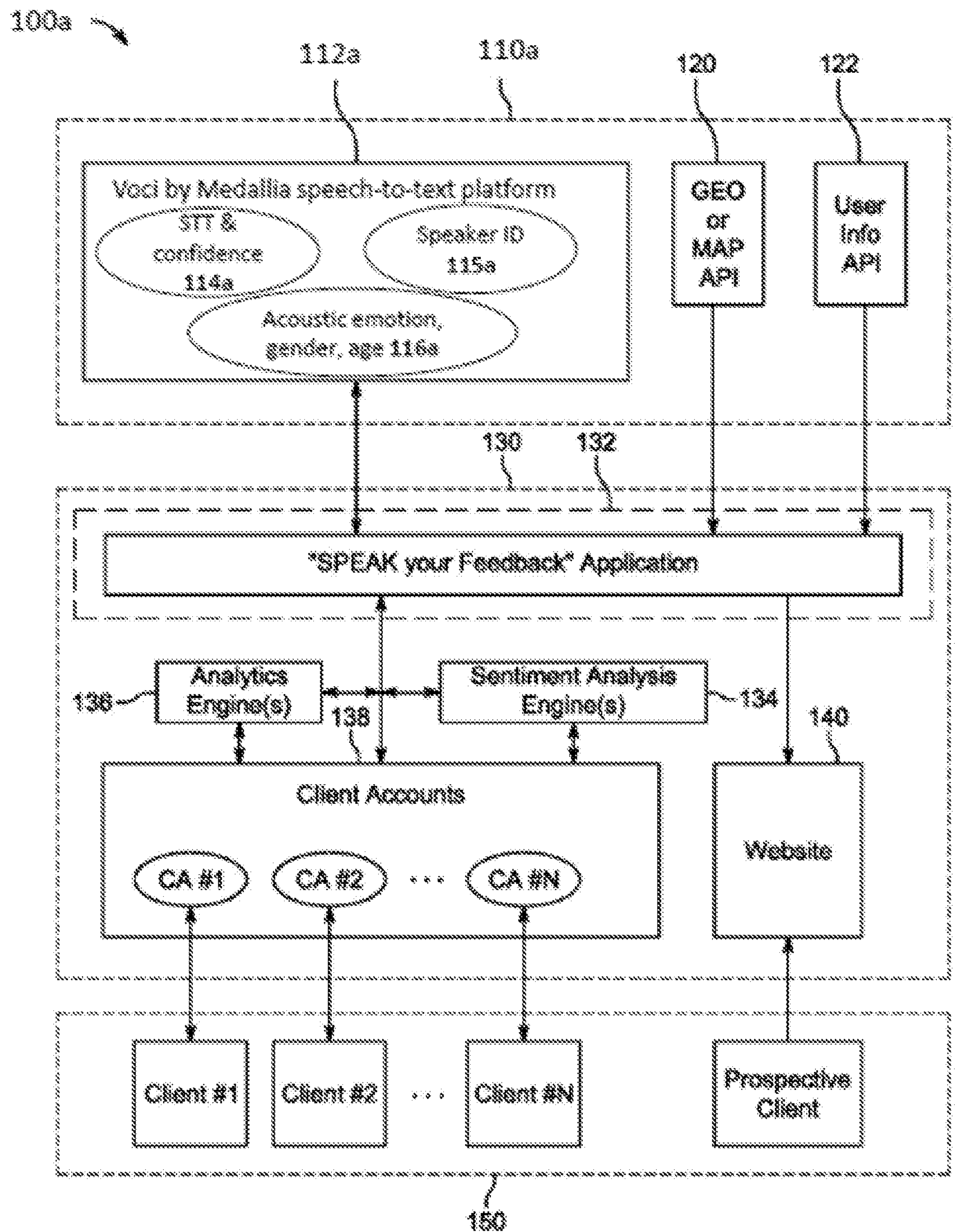
FIG. 9 shows an illustrative block diagram of an alternative embodiment of the audio feedback action system of FIG. 1.

FIG. 9 shows an alternative embodiment of an AFA system 100*a*. As compared to the FIG. 1 embodiment, the structural differences in FIG. 9 lie within the customer device 110*a*, and specifically involve the replacement of virtual assistant platform 112 with an alternative voice recognition platform 112*a*, such as the Voci by Medallia speech-to-text platform sold by the assignee of this application. In FIG. 9, voice recognition platform 112*a* includes a speech-to-text and confidence module 114*a* that produces a text string, along with an indication of confidence in the accuracy of the recognition, an acoustic metadata module 116*a* that estimates the speaker's emotion, gender, and/or age, and a speaker identification module 115*a* that compares the speaker's voice to a stored voiceprint or sample of his/her speech.

As persons skilled in the art will appreciate, ingestion of these additional signals provides an opportunity to improve performance or offer additional capabilities in the AFA system 100*a*. For example, confidence scores can be used to screen out reviews whose recognition confidence is below a particular threshold, such as 50% or 60%. Similarly, an acoustic emotion score can be used to improve the accuracy of the sentiment analysis 134. And the speaker ID result can be used to improve data quality and security by rejecting reviews provided by multiple speakers through the same mobile device, and/or by rejecting multiple reviews by the same speaker through multiple devices.

It is appreciated that the feedback and any data associated therewith, e.g., emotional context, etc., may be provided to the business entity in real time or contemporaneously. As such, appropriate corrective action may be determined and taken in order to improve services/products being offered.

For example, providing the feedback and any data associated therewith in real time enables the business entity to reach out to the customer directly in real time by facilitating a communication channel, e.g., through the system disclosed such as the feedback system, telephone, email, text, etc., and address any issues in order to improve customers' experience.

Figure 10:
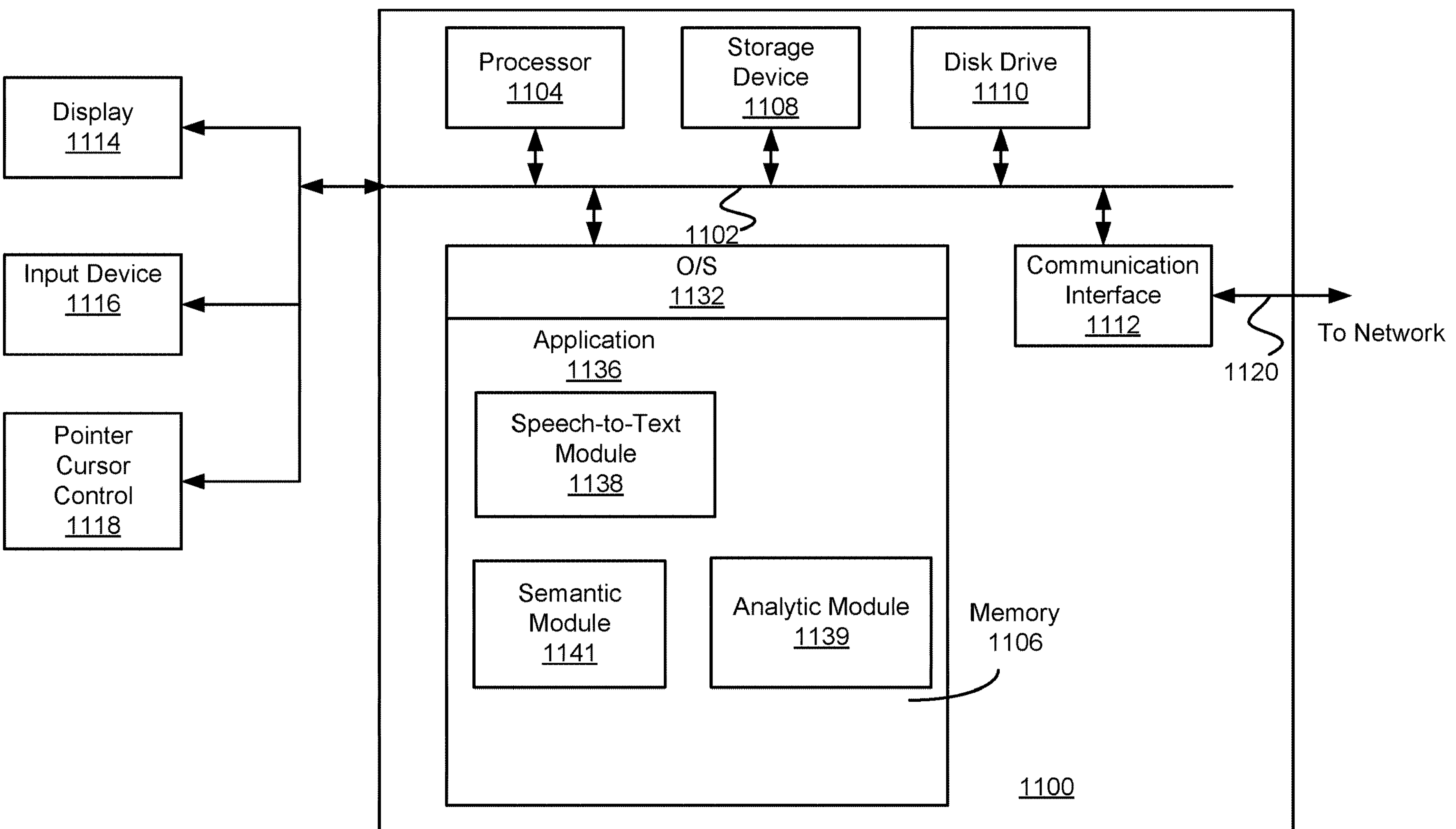
FIG. 10 shows an exemplary block diagram of a computer system suitable for capturing audio feedback and analyzing the audio feedback, in accordance with some embodiments is shown.

Referring now to FIG. 10, an exemplary block diagram of a computer system suitable for capturing audio feedback and analyzing the audio feedback, in accordance with some embodiments is shown. In some examples, computer system 1100 can be used to implement computer programs, applications, methods, processes, or other software to perform the above-described techniques and to realize the structures described herein. Computer system 1100 includes a bus 1102 or other communication mechanism for communicating information, which interconnects subsystems and devices, such as a processor 1104, a system memory ("memory") 1106, a storage device 1108 (e.g., ROM), a disk drive 1110 (e.g., magnetic or optical), a communication interface 1112 (e.g., modem or Ethernet card), a display 1114 (e.g., CRT or LCD), an input device 1116 (e.g., keyboard), and a pointer cursor control 1118 (e.g., mouse or trackball). In one embodiment, pointer cursor control 1118 invokes one or more commands that, at least in part, modify the rules stored, for example in memory 1106, to define the electronic message preview process.

According to some examples, computer system 1100 performs specific operations in which processor 1104 executes one or more sequences of one or more instructions stored in system memory 1106. Such instructions can be read into system memory 1106 from another computer readable medium, such as static storage device 1108 or disk drive 1110. In some examples, hard-wired circuitry can be used in place of or in combination with software instructions for implementation. In the example shown, system memory 1106 includes modules of executable instructions for implementing an operation system ("O/S") 1132, an application 1136 (e.g., a host, server, web services-based, distributed (i.e., enterprise) application programming interface ("API"), program, procedure or others). Further, application 1136 includes a module of executable instructions for speech-to-text module 1138 that converts speech to text, semantic module 1141 to derive emotions and an analytic module 1139 that classifies the audio feedback, e.g., positive, negative, neutral, angry, happy, sad, etc.

The term "computer readable medium" refers, at least in one embodiment, to any medium that participates in providing instructions to processor 1104 for execution. Such a medium can take many forms, including but not limited to, non-volatile media, volatile media, and transmission media. Non-volatile media includes, for example, optical or magnetic disks, such as disk drive 1110. Volatile media includes dynamic memory, such as system memory 1106. Transmission media includes coaxial cables, copper wire, and fiber optics, including wires that comprise bus 1102. Transmission media can also take the form of acoustic or light waves, such as those generated during radio wave and infrared data communications.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, electromagnetic waveforms, or any other medium from which a computer can read.

In some examples, execution of the sequences of instructions can be performed by a single computer system 1100. According to some examples, two or more computer systems 1100 coupled by communication link 1120 (e.g., LAN, PSTN, or wireless network) can perform the sequence of instructions in coordination with one another. Computer system 1100 can transmit and receive messages, data, and instructions, including program code (i.e., application code) through communication link 1120 and communication interface 1112. Received program code can be executed by processor 1104 as it is received, and/or stored in disk drive 1110, or other non-volatile storage for later execution. In one embodiment, system 1100 is implemented as a hand-held device. But in other embodiments, system 1100 can be implemented as a personal computer (i.e., a desktop computer) or any other computing device. In at least one embodiment, any of the above-described delivery systems can be implemented as a single system 1100 or can implemented in a distributed architecture including multiple systems 1100.

In other examples, the systems, as described above can be implemented from a personal computer, a computing device, a mobile device, a mobile telephone, a facsimile device, a personal digital assistant ("PDA") or other electronic device. Various embodiments can apply to any electronic screen sharing.

In at least some of the embodiments, the structures and/or functions of any of the above-described interfaces and panels can be implemented in software, hardware, firmware, circuitry, or a combination thereof. Note that the structures and constituent elements shown throughout, as well as their functionality, can be aggregated with one or more other structures or elements.

Alternatively, the elements and their functionality can be subdivided into constituent sub-elements, if any. As software, the above-described described techniques can be implemented using various types of programming or formatting languages, frameworks, syntax, applications, protocols, objects, or techniques, including C, Objective C, C++, C#, Flex™, Fireworks®, Java™, Javascript™, AJAX, COBOL, Fortran, ADA, XML, HTML, DHTML, XHTML, HTTP, XMPP, and others. These can be varied and are not limited to the examples or descriptions provided.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Moreover, any processes described with respect to FIGS. 1-9, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

The invention claimed is:

1. A computer-implemented method, comprising:

receiving a user provided audio feedback in response to a user interacting with a virtual assistant platform, wherein the user provided audio feedback is provided to a speech to text engine that converts the user provided audio feedback to digital form, wherein the audio feedback is associated with a user interaction with a business, product, or service;

converting the user provided audio feedback in digital form to text via speech to text (STT) platform;

generating a metadata from prosodic and acoustic features of the audio feedback, wherein the metadata is device generated metadata;

classifying a polarity associated with the audio feedback via a sentiment analysis engine;

determining an emotion context data associated with the audio feedback using machine learning and artificial intelligence algorithms, wherein the determining is based on the metadata and further based on processing the audio feedback in textual form using at least one of a natural language processing, text analysis, and computational linguistics, and wherein the determining is further based on the classifying;

determining a business name associated with the received audio feedback based on analyzing the text and further based on receiving a geolocational data via an application programming interface (API) running on a user device;

identifying a client account associated with the business name;

responsive to the identifying, posting the feedback and the determined emotion to a location-specific response feed of a feedback website associated with the identified client account;

generating a Unit in response to receipt of the audio feedback, wherein the Unit represents an interaction between a representative associated with a client account and the customer; and generating a report based on the Unit.

2. The computer-implemented method of claim 1, further comprising:

posting the feedback to a generic response feed of a publicly accessible website, wherein the posting the feedback to the generic response feed is associated with the identified client account responsive to identifying the business name and in absence of the business location being known.

3. The computer-implemented method of claim 1, further comprising:

posting the feedback to a feedback website when the business name is not associated with any client accounts.

4. The computer-implemented method of claim 1 further comprising:

identifying the business name or the business location using a map application program interface.

5. The computer-implemented method of claim 1, further comprising:

accessing a user profile of the user via the speech to text engine; and associating the user profile with the audio feedback.

6. The computer-implemented method of claim 1, wherein the feedback is posted to the location-specific response feed to enable an employee of the identified client account to engage in a closed loop feedback with the user.

7. The computer-implemented method of claim 6, wherein the closed loop feedback comprises an inner loop and an outer loop, wherein the inner loop comprises:

following up with the user in response to the received feedback to obtain additional information; and identifying and executing actions based on the feedback and the obtained additional information; and wherein the outer loop comprises:

aggregating information collected from the inner loop to provide an aggregated data set; and analyzing the aggregated data set to develop systematic improvements for the identified client account.

8. The computer-implemented method of claim 6, wherein the closed loop feedback comprises an inner loop, an account loop, and an outer loop, wherein the inner loop addresses individual feedback by the user, wherein the account loop addresses action at an account-level with respect to the user, and wherein the outer loop addresses systematic and business/industry level issues.

9. The computer-implemented method of claim 1, wherein the posted feedback is in an audio format.

10. The computer-implemented method of claim 1, wherein the posted feedback is in a textual format.

11. The computer-implemented method of claim 1 further comprising classifying the audio feedback based on the emotional context data.

12. A computer-implemented method comprising:

receiving audio feedback related to a feedback target from a customer during interaction with a virtual assistant platform, wherein the audio feedback is received at a speech to text engine;

generating a metadata from prosodic and acoustic features of the audio feedback, wherein the metadata is device generated metadata;

classifying a polarity associated with the audio feedback via a sentiment analysis engine;

determining an emotion context data associated with the audio feedback using machine learning and artificial intelligence algorithms, wherein the determining is based on the metadata and further based on processing the audio feedback in textual form using at least one of a natural language processing, text analysis, and computational linguistics, and wherein the determining is further based on the classifying;

determining a business entity associated with the feedback target, wherein the determining the business entity is based on processing the audio feedback in textual form and is further based on receiving a geolocational data via an application programming interface (API) running on a user device;

determining a user profile associated with the customer;

providing the received audio feedback, the determined emotion context data, and the user profile to the business entity;

enabling the business entity to directly engage the customer contemporaneously with the audio feedback submission by the customer via a communication channel;

generating a Unit in response to receipt of the audio feedback, wherein the Unit represents an interaction between a representative associated with the business entity and the customer; and generating a report based on the Unit.

13. The computer-implemented method of claim 12, wherein the received audio feedback and the user profile are provided to the business entity contemporaneously with receipt of the audio feedback.

14. The computer-implemented method of claim 12, wherein an application programming interface running on a device associated with the customer provides the geolocational data.

15. The computer-implemented method of claim 12, wherein determining the business location comprises:

obtaining the business location from textual analysis of the audio feedback in text form.

16. The computer-implemented method of claim 12, wherein the Unit comprises a name, an identifier, address where the Unit is located, Unit data fields, and Unit groups.

17. The computer-implemented method of claim 12, wherein the method further comprises:

posting the received audio feedback in a location-specific response feed associated with the business entity if the business entity has an account with a feedback service and the business location is identified;

posting the received audio feedback to a generic response feed associated with the business entity if the business entity has an account with the host service and the business location is unidentified; and posting the received audio feedback to a website if the business entity does not have an account with the host service; and tagging the posting with business related identifying information including the business name or the business location.

18. The computer-implemented method of claim 17, wherein the method further includes associating the received audio feedback with a Unit in a database if the business entity has an account with a feedback service and the business location is identified, wherein the Unit represents an interaction between a representative associated with a client account and the customer.

19. The computer-implemented method of claim 12 further comprising classifying the audio feedback based on the emotional context data.

20. A computer-implemented method comprising:

initiating a voice recognition platform that solicits feedback related to a service or product provided by a feedback target;

soliciting feedback from a customer by causing the voice recognition platform to render a series of audio questions for the customer that include a business name or a business location, and wherein the soliciting further includes receiving a geolocational data from a user device;

in response to receiving voice identification of the business name or the business location from the customer, rendering a list of potential businesses corresponding to the business name or the business location on a display;

in response to receiving a user selection of a feedback target from the list of potential businesses, rendering a page comprising a plurality of selectable elements, including a feedback element on the display;

in response to receiving a user selection of the feedback element, outputting an audio for prompting the user to provide feedback for the feedback target;

receiving voice feedback of the feedback target;

generating a metadata from prosodic and acoustic features of the voice feedback, wherein the metadata is device generated metadata;

determining an emotion context data associated with the voice feedback using machine learning and artificial intelligence algorithms, wherein the determining is based on the metadata and further based on processing the voice feedback using at least one of a natural language processing, text analysis, and computational linguistics;

generating a Unit in response to receipt of the voice feedback, wherein the Unit represents an interaction between a representative associated with the feedback target and the customer; and generating a report based on the Unit.

21. The computer-implemented method of claim 20, further comprising:

providing the voice feedback of the feedback target to a feedback service operative to route the voice feedback to the business identified in the business name.

22. The computer-implemented method of claim 20, further comprising:

interacting with the feedback target after the business identified in the business name initiates a close the feedback action.

23. The computer-implemented method of claim 20 further comprising processing the voice feedback to derive emotional context data associated with the voice feedback.

24. The computer-implemented method of claim 23 further comprising classifying the voice feedback based on the emotional context data.

* * * * *